US012760462B2

(12) United States Patent
Lee et al.

(10) Patent No.: US 12,760,462 B2
(45) Date of Patent: Oct. 13, 2026

(54) INTERFACE AND CLOTHING TREATMENT APPARATUS INCLUDING INTERFACE

(71) Applicant: LG Electronics Inc., Seoul (KR)

(72) Inventors: Hyunseung Lee, Seoul (KR); Kyuchul Lee, Seoul (KR); Yulgi Jin, Seoul (KR); Joongil Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 18/717,717

(22) PCT Filed: Nov. 18, 2022

(86) PCT No.: PCT/KR2022/018271

§ 371 (c)(1),
(2) Date: Jun. 7, 2024

(87) PCT Pub. No.: WO2023/106683

PCT Pub. Date: Jun. 15, 2023

(65) Prior Publication Data

US 2025/0034777 A1 Jan. 30, 2025

(30) Foreign Application Priority Data

Dec. 7, 2021 (KR) ........................ 10-2021-0174082
Apr. 22, 2022 (KR) ........................ 10-2022-0049882

(51) Int. Cl.

*D06F 34/05* (2020.01)
*D06F 34/30* (2020.01)
*D06F 34/32* (2020.01)
*D06F 34/34* (2020.01)
*D06F 105/58* (2020.01)
*H01H 19/14* (2006.01)

(52) U.S. Cl.

CPC .............. *D06F 34/05* (2020.02); *D06F 34/30* (2020.02); *D06F 34/32* (2020.02); *D06F 34/34* (2020.02); *D06F 2105/58* (2020.02); *H01H 19/14* (2013.01)

(58) Field of Classification Search

CPC ........... H01H 2231/012; H01H 19/025; H01H 19/14; H01H 19/02; H01H 19/11;
(Continued)

(56) References Cited

U.S. PATENT DOCUMENTS 11,287,289 B2 * 3/2022 Sun ...................... G01D 5/3473
11,933,502 B2 * 3/2024 Cowan .................... F24C 7/082
(Continued)

FOREIGN PATENT DOCUMENTS

CN 209468599 U 10/2019
JP 2013-188334 A 9/2013
(Continued)

OTHER PUBLICATIONS

Extended European Search Report in European Appin. No. 22904516.6, mailed on Feb. 10, 2025, 10 pages.
(Continued)

*Primary Examiner* — Ahmed M Saeed
(74) *Attorney, Agent, or Firm* — Fish & Richardson P.C.

(57) ABSTRACT

An interface of a clothing treatment apparatus includes: an encoder including a fixed part fixed to a first circuit board, a rotating part, and a signal generation part, an actuator, a handle having an accommodation space and a handle through-hole, a display unit including a fastening body, a fixed body inside the accommodation space, a display, a second circuit board, which controls the display and communicates with the first circuit board, and a cover fixed to the fixed body, and a selection unit that transmits a control signal to a control circuit of the second circuit board if the body of a user is in contact with the cover. The selection unit includes a first selection unit for receiving a selection signal of a control command, and a second selection unit for receiving an execution signal or a stop signal of a selected control command.

11 Claims, 9 Drawing Sheets

(58) Field of Classification Search
CPC ...... H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 2019/006; H01H 19/00; H01H 19/20; H01H 19/001; H01H 21/50; H01H 2221/01; D06F 34/30; D06F 34/32; D06F 34/34; D06F 2105/58
See application file for complete search history.

(56) References Cited

U.S. PATENT DOCUMENTS

| | | | | |
|---|---|---|---|---|
| 2015/0299929 | A1* | 10/2015 | Yang | G02B 6/0001 362/23.1 |
| 2017/0321366 | A1 | 11/2017 | Oh et al. | |
| 2019/0301744 | A1 | 10/2019 | Yang | |

FOREIGN PATENT DOCUMENTS

| | | | |
|---|---|---|---|
| KR | 10-2010-0092764 | A | 8/2010 |
| KR | 10-2016-0010093 | A | 1/2016 |
| KR | 10-2017-0082059 | A | 7/2017 |
| KR | 20-2019-0000990 | U | 4/2019 |

OTHER PUBLICATIONS

International Search Report and Written Opinion in International Appln. No. PCT/KR2022/018271, mailed on Mar. 2, 2023, 17 pages (with English translation).
Notice of Allowance in Korean Appln. No. 10-2024-0120597, mailed on Jul. 7, 2026, 4 pages (with English translation).

* cited by examiner

INTERFACE AND CLOTHING TREATMENT APPARATUS INCLUDING INTERFACE

CROSS-REFERENCE TO RELATED APPLICATIONS

This application is a National Stage application under 35 U.S.C. § 371 of International Application No. PCT/KR2022/018271, filed on Nov. 18, 2022, which claims the benefit of Korean Application Nos. 10-2022-0049882, filed on Apr. 22, 2022, and 10-2021-0174082, filed on Dec. 7, 2021. The disclosures of the prior applications are incorporated by reference in their entirety.

TECHNICAL FIELD

The present disclosure relates to an interface and a laundry treatment apparatus including the interface.

BACKGROUND ART

Electronic devices as well as laundry treatment apparatus which enable washing of laundry (which refers to an object to be washed and an object to be dried), drying of laundry, and both washing and drying of laundry are essentially provided with an input/output device (that is, an interface) which allows a user to input a control command to the electronic devices.

A conventional interface is designed such that a display unit configured to display control commands which can be selected by a user, a search unit configured to allow a user to search control commands displayed on the display unit, a selector unit configured allow the user to select the control commands displayed on the display unit, and an input unit configured to request execution of a control command selected by the user are positioned in separate spaces (Korea unexamined patent publication No. 10-2014-0023986).

In other words, a conventional interface is constructed such that a display (an LCD, an LED panel or the like) on which control commands are displayed, a knob or a button which allows control commands, which can be executed by an associated electronic device, to be displayed on the display such that the control commands are searched by a user, a button which allows the user to select a desired one of the control commands displayed on the display, and a button which allows a control command about request of execution of the selected control command, are positioned in separate spaces. The arrangement of the components is a factor affecting the design of the interface (the design of a control panel) which is positioned on the front surface or the like of an electronic device such as a laundry treatment apparatus.

Because the above-described conventional interface should be constructed such that various devices such as a display are separately arranged in the width direction of an electronic device (in the width direction of a laundry treatment) or in the height direction of the electronic device, a large space is required for installation of the interface.

Meanwhile, the buttons provided at the conventional interface are assembled with a panel or a control panel which defines the appearance of the electronic device. Here, there is a need to minimize the time required for assembly of the buttons and misassembly of the buttons.

DISCLOSURE

Technical Task

An object of the present disclosure is to provide an interface in which display of control commands, search and change of the displayed control commands, and selection of the displayed control commands are conducted through a single device, and a laundry treatment apparatus including the interface.

Furthermore, an object of the present disclosure is to provide an interface which requires a minimum space for installation thereof, and a laundry treatment apparatus including the interface.

In addition, an object of the present disclosure is to provide a laundry treatment apparatus which is facilitated in assembly and is capable of lowering the possibility of misassembly.

Technical Solutions

The present disclosure provides an interface including an encoder comprising a stationary portion fixed to a first circuit board, a rotating portion rotatably coupled to the stationary portion, and a signal generator configured to transmit a control signal to a control circuit of the first circuit board upon rotation of the rotating portion, an actuator comprising a shaft fixed to the rotating portion, a handle which is fixed to the shaft and to which force required for rotation of the shaft is applied, a receiving space defined in the handle, and a handle through hole which is formed through one surface of the handle so as to allow the receiving space to communicate with an outside, a display unit comprising a fastening body which extends through the shaft and is fixed to the stationary portion, a stationary body which is fixed to the fastening body and is positioned in the receiving space, a mounting space defined in the stationary body, a display which is fixed in the mounting space and displays information, a second circuit board which controls the display and enables exchange of control signals with the first circuit board, and a cover which is fixed to the stationary body so as to close the mounting space, and a selector unit which is provided in the mounting space and is configured to transmit a control signal to a control circuit of the second circuit board when a user body comes into contact with the cover.

The selector unit may include a first selector portion configured to receive a selection signal of a control command, and a second selector portion configured to receive an execution signal or a halt signal of a selected control command.

The first selector portion and the second selector portion may be positioned so as not to interfere with the display.

The interface may further include a mounting body fixed in the mounting space, a panel mounting portion which is provided at the mounting body and to which the display is mounted, and a film mounting portion which is provided at the mounting body and to which the first selector portion and the second selector portion are mounted.

The film mounting portion may be positioned below the panel mounting portion.

The interface may further include first and second lamps which are provided at the second circuit board so as to emit light, a first lamp through hole which is formed through the mounting body so as to guide light emitted from the first lamp to the first selector portion, and a second lamp through hole which is formed through the mounting body so as to guide light emitted from the second lamp to the second selector portion.

The first selector portion and the second selector portion may be positioned between the cover and the display.

The interface may further include a first connector (a display connector) connecting the display to the second circuit board, a second connector (a film connector) connecting the first and second selector portions to the second circuit board, a first connector through hole which is formed through the mounting body and into which the first connector is inserted, and a second connector through hole which is formed through the mounting body and into which the second connector is inserted.

The present disclosure provides a laundry treatment apparatus including a drum which defines a space configured to receive laundry and which is rotated by a drive unit, an encoder comprising a first circuit board configured to control the drive unit, a stationary portion fixed to the first circuit board, a rotating portion rotatably coupled to the stationary portion, and a signal generator configured to transmit a control signal to a control circuit of the first circuit board upon rotation of the rotating portion, an actuator comprising a shaft fixed to the rotating portion, a handle which is fixed to the shaft and to which force required for rotation of the shaft is applied, a receiving space defined in the handle, and a handle through hole which is formed through one surface of the handle so as to allow the receiving space to communicate with an outside, a display unit comprising a fastening body which extends through the shaft and is fixed to the stationary portion, a stationary body which is fixed to the fastening body and is positioned in the receiving space, a mounting space defined in the stationary body, a display which is fixed in the mounting space and displays information, a second circuit board which controls the display and enables exchange of control signals with the first circuit board, and a cover which is fixed to the stationary body so as to close the mounting space, and a selector unit which is provided in the mounting space and is configured to transmit a control signal to a control circuit of the second circuit board when a user body comes into contact with the cover.

The selector unit may include a first selector portion configured to receive a selection signal of a control command, and a second selector portion configured to receive an execution signal or a halt signal of a selected control command.

The laundry treatment apparatus may further include a mounting body fixed in the mounting space, a panel mounting portion which is provided at the mounting body and to which the display is mounted, and a film mounting portion which is provided at the mounting body and which has a space in which the first selector portion and the second selector portion are mounted, the film mounting portion being positioned below or above the panel mounting portion.

The laundry treatment apparatus may further include first and second lamps which are provided at the second circuit board so as to emit light, a first lamp through hole which is formed through the mounting body so as to guide light emitted from the first lamp to the first selector portion, and a second lamp through hole which is formed through the mounting body so as to guide light emitted from the second lamp to the second selector portion.

The laundry treatment apparatus may further include a first connector (a display connector) connecting the display to the second circuit board, a second connector (a film connector) connecting the first and second selector portions to the second circuit board, a first connector through hole which is formed through the mounting body and into which the first connector is inserted, and a second connector through hole which is formed through the mounting body and into which the second connector is inserted.

Advantageous Effects

The present disclosure provides an interface in which display of control commands, search and change of the displayed control commands, and selection of the displayed control commands are conducted through a single device, and a laundry treatment apparatus including the interface.

Furthermore, the present disclosure provides an interface which requires a minimum space for installation thereof, and a laundry treatment apparatus including the interface.

In addition, the present disclosure provides a laundry treatment apparatus which is facilitated in assembly and is capable of lowering the possibility of misassembly.

BEST MODE FOR DISCLOSURE

Hereinafter, preferred embodiments of a laundry treatment apparatus and a method of controlling the laundry treatment apparatus will be described in detail with reference to the accompanying drawings.

Figure 1:
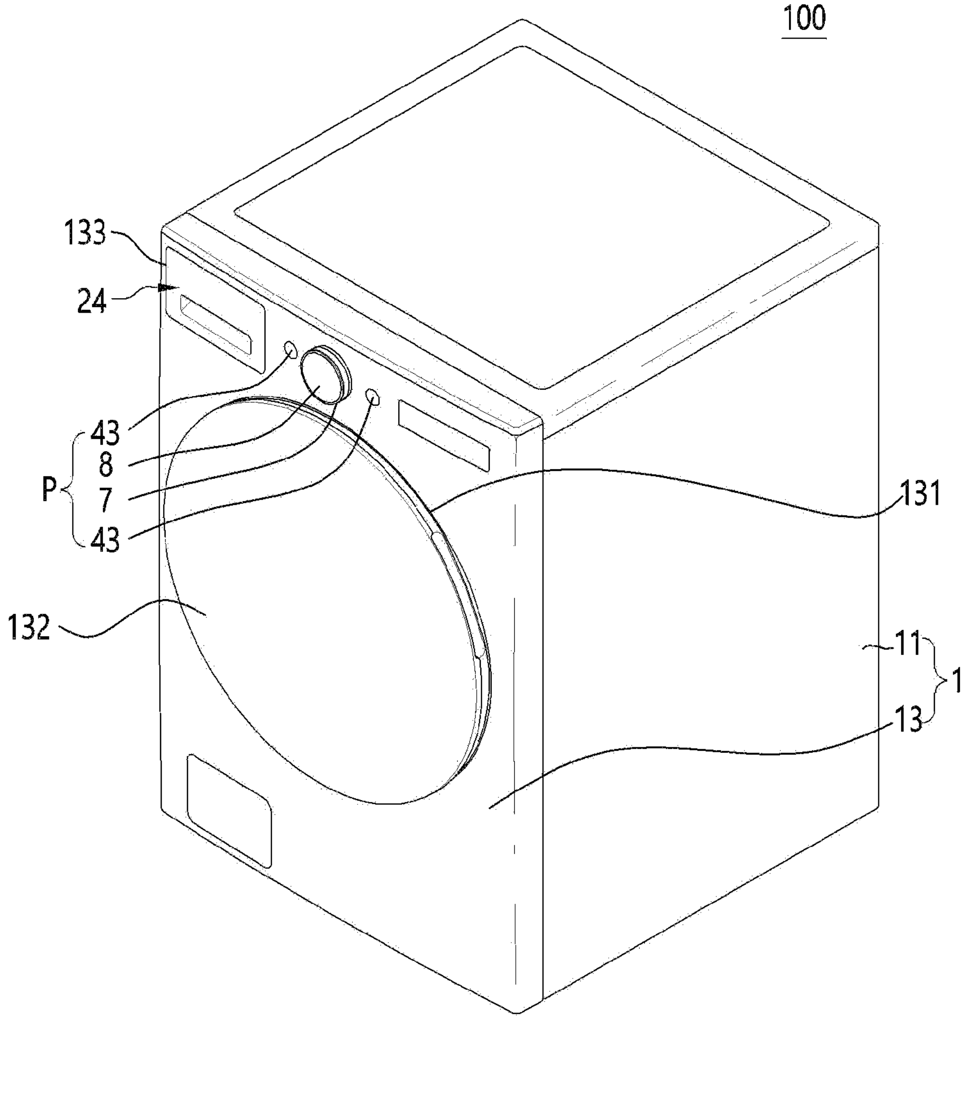
FIGS. 1 and 2 illustrate an embodiment of a laundry treatment apparatus according to the present disclosure.

As illustrated in FIG. 1, the laundry treatment apparatus 100 includes a cabinet 1 and an interface P included in the cabinet 1. The interface P disclosed in the present disclosure refers to a device or a program configured to enable communication between a user and the laundry treatment apparatus (including various electronic devices). The communication between a user and the laundry treatment apparatus means a procedure of inputting control commands to the laundry treatment apparatus by a user and a procedure of transmitting information to the user from the laundry treatment apparatus.

The cabinet 1 may include a cabinet body 11 which is open at one side thereof and a panel 13 fixed to the open side of the cabinet body. FIG. 1 exemplarily illustrates an embodiment in which the cabinet body 11 includes an open front surface and the panel 13 is composed of a front panel which is fixed to the cabinet body 11 so as to define the front surface of the laundry treatment apparatus.

Figure 2:
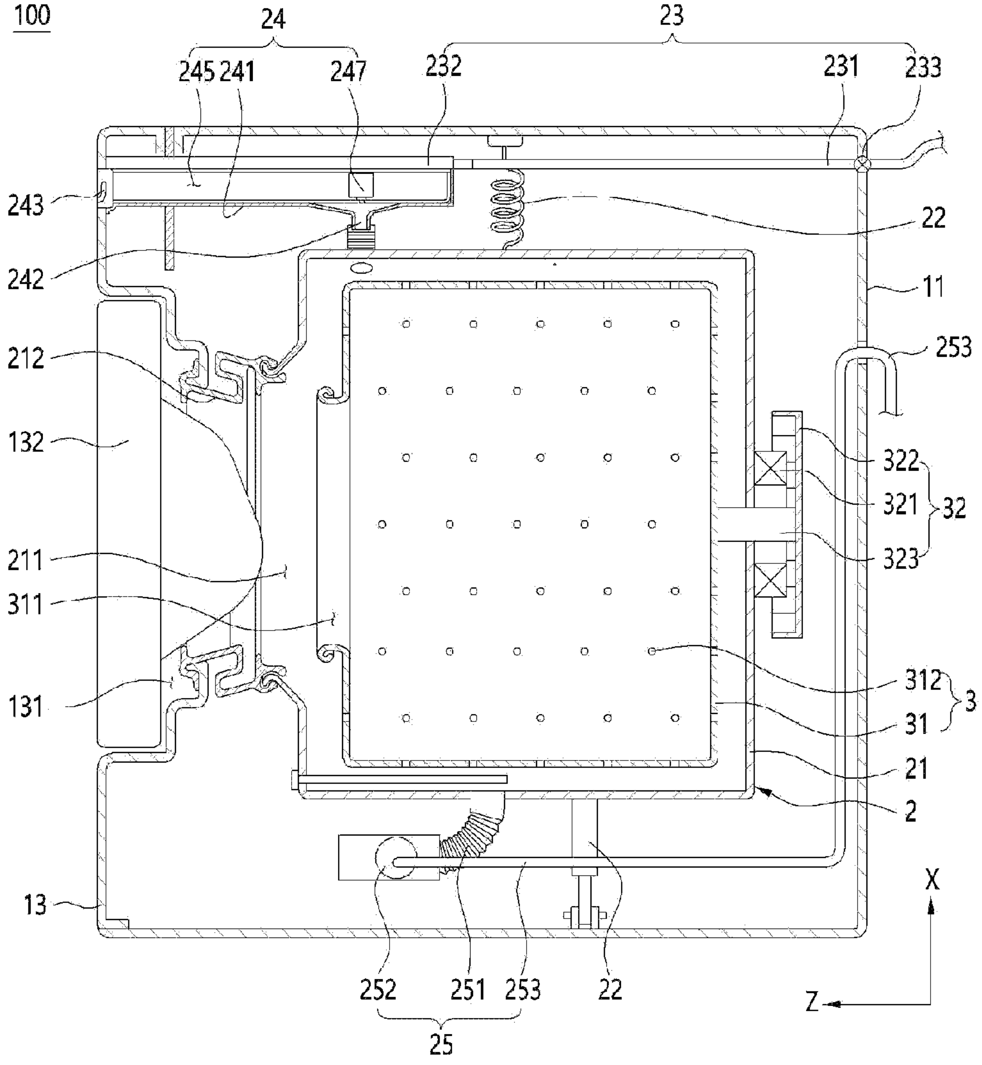

As illustrated in FIG. 2, the front panel 13 is provided with a panel introduction port 131 which allows the inside of the cabinet 1 to communicate with the outside of the cabinet 1. The panel introduction port 131 is closed by a door 132 which is rotatably fixed to the cabinet 1.

The cabinet 1 is provided therein with a tub 2 defining a space configured to store water therein, and a drum 3 which is rotatably provided in the tub and defines a space configured to receive laundry (that is, objects to be washed or dried).

The tub 2 may include a hollow cylindrical tub body 21. The tub body 21 may be fixed in the cabinet 1 by means of a tub support 22. FIG. 2 exemplarily illustrates an embodiment in which the tub support 22 is composed of a spring (configured to connect the upper space of the tub body to the cabinet) and a damper (configured to connect the lower space of the tub body to the cabinet).

The side of the space defined by the tub body 21 that faces the panel introduction port 131 is provided with a tub introduction port 211. The panel introduction port 131 and the tub introduction port 211 are connected to each other via a gasket 212. The gasket 212 is made of an elastic body such as rubber so as to serve to prevent the water in the tub body 21 from being discharged to the inside of the cabinet 1 and to minimize transmission of vibration of the tub body 21 to the cabinet 1.

The tub body 21 may receive water from a water supply unit 23, and the water stored in the tub body 21 may be discharged to the outside of the cabinet 1 through a water discharge unit 25.

The water discharge unit 25 may include a pump 252, which is positioned at a point lower than the bottom surface of the tub body 21, a first draining pipe 251 connecting the tub body 21 to the pump 252, and a second draining pipe 253 configured to guide the water discharged from the pump 252 to the outside of the cabinet.

The water supply unit 23 may include a water supply pipe 231 connecting the tub body 21 to a water supply source positioned outside the cabinet, and a water supply valve 233 configured to control opening and closing of the water supply pipe 231.

As illustrated in the drawing, the laundry treatment apparatus 100 may further be provided with a detergent supply unit 24.

Figure 3:
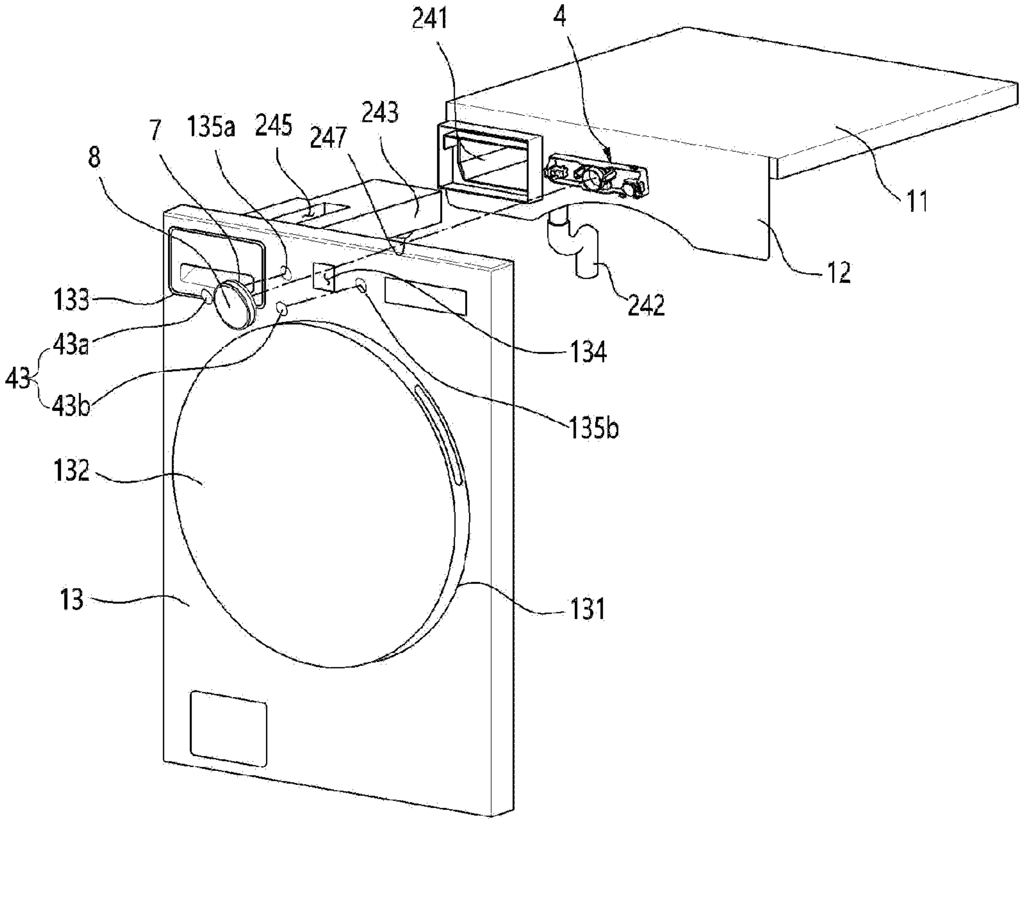
FIGS. 3 to 5 illustrate an embodiment of an interface provided at the laundry treatment apparatus.

As illustrated in FIG. 3, the detergent supply unit 24 may include a drawer housing 241 provided in the cabinet 1, a connecting pipe 242 connecting the drawer housing to the tub body 21, and a drawer 243 which is drawn from and put into the drawer housing 241 through a drawer port 133 provided at the front panel 13.

As illustrated in FIG. 2, the drawer 243 may include a chamber 245 defining a space configured to store detergent therein, and a discharge passage 247 configured to discharge the detergent in the chamber to the drawer housing 241. The discharge passage 247 may be embodied as a water trap (such as a siphon passage) configured to move the liquid stored in the chamber 245 to the drawer housing 241 when the level of the water stored in the chamber 245 exceeds a set water level.

In the case in which the detergent supply unit 24 is provided in the laundry treatment apparatus 100, the water supply unit 23 may further include a nozzle 232 configured to supply water to the chamber 245. The nozzle 232 may be fixed to the cabinet 1 so as to define the upper surface of the drawer housing 241, and the water supply pipe 231 may be configured to connect the nozzle 232 to the water supply source.

The drum 3 may include a cylindrical drum body 31 disposed in the tub body 21, and a drive unit 32 configured to rotatably fix the drum body 31 to the tub body 21.

The side of the space defined by the drum body 31 that faces the tub introduction port 211 may be provided with a drum introduction port 311. Consequently, laundry may be introduced into the drum body 31 through the panel introduction port 131, the tub introduction port 211, and the drum introduction port 311.

The drum body 31 may be provided with drum through holes 312 which allow the inside of the drum to communicate with the outside of the drum. The drum through holes 312 may be formed in the circumferential surface, the front surface (the surface surrounding the drum introduction port) and the rear surface of the drum body 31. Accordingly, water or detergent supplied to the inside of the tub body 21 may be supplied to the inside of the drum body 31 through the drum through holes 312.

The drive unit 32 may include a stator 321 which is fixed to the rear surface of the tub body 21 so as to generate a rotating magnetic field, a rotor 322 configured to be rotated by the rotating magnetic field, and a rotating shaft 323 which extends through the rear surface of the tub body 21 and connects the drum body 31 to the rotor 322.

As illustrated in FIG. 3, the front panel 13 may be fixed to the cabinet body 11 via a panel support 12. Specifically, the panel support 12 may be fixed to the cabinet body 11, and the front panel 13 may be fixed to the panel support 12.

The interface P may be fixed to the panel support 12 or the front panel 13.

Figure 4:
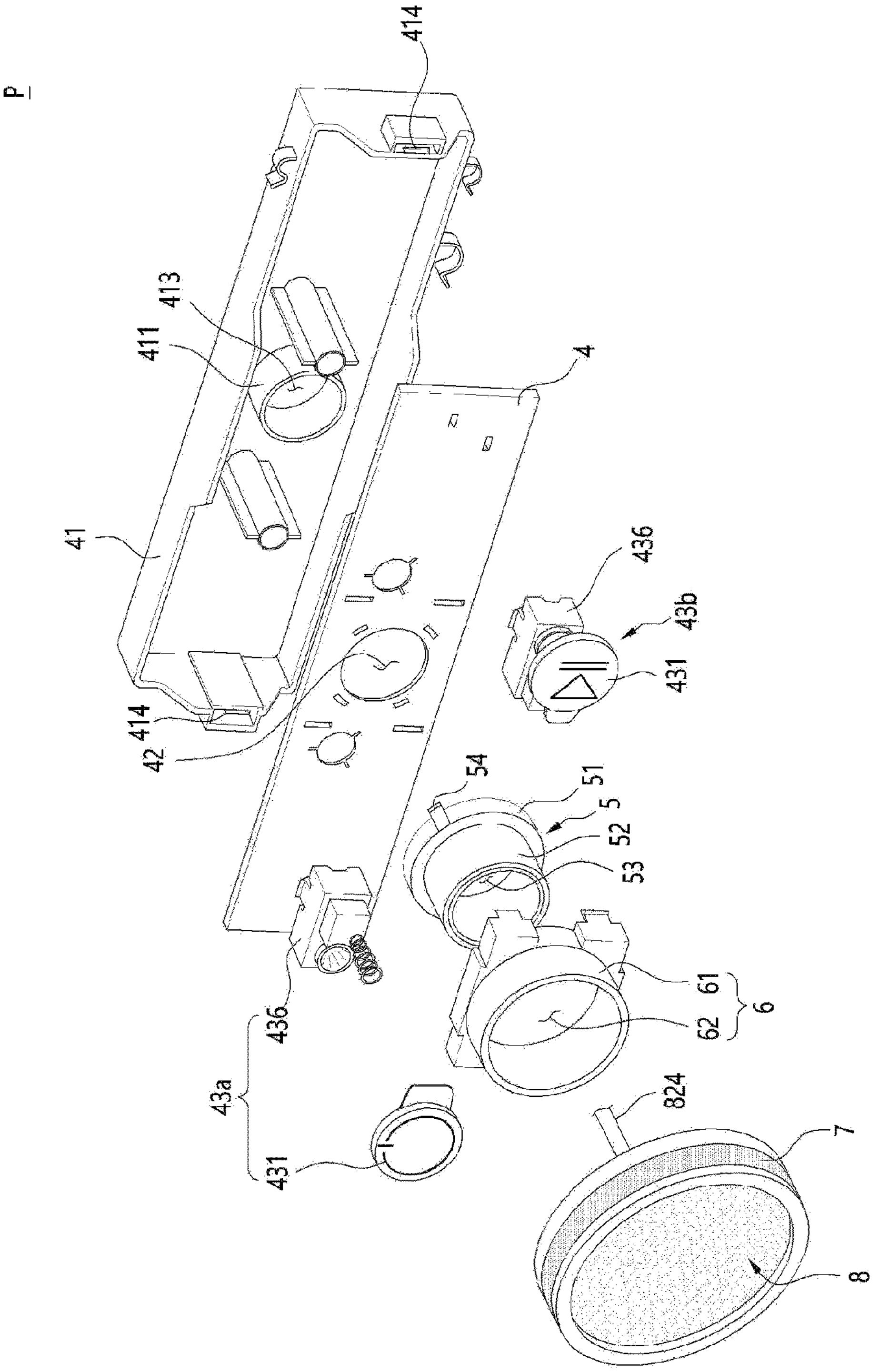

As illustrated in FIG. 4, the interface P may include a circuit board (a first circuit board) 4 positioned in the cabinet 1, an encoder 5 which is fixed to the first circuit board and is positioned in the cabinet 1, an actuator 7 which extends through the front panel 13 and is connected to the encoder 5, and a display unit 8 which extends through the front panel 13 and is fixed to the encoder 5.

The first circuit board 4, which is a board including a control circuit required for control (power control and operational control) of at least one of the drive unit 32, the water supply valve 233 or the pump 252, may be fixed to the front panel 13 via the case 41. The first circuit board 4 may be composed of a first main board fixed to the case 41 and a control circuit (a first circuit) fixed to the first main board.

The case 41 may be provided with a positioner 411 configured to set the position of the first circuit board 4. In this case, the first circuit board 4 may be provided with a board through hole 42 through which the positioner 411 inserted.

The display unit 8 may be connected to a wire 824. The wire 824 may be embodied as a power line configured to supply power to the display unit or a communication line configured to allow communication with the devices positioned in the cabinet as well as the first circuit board 4.

The positioner 411 may have a positioner through hole 413. Here, the wire 824 may be inserted into the positioner through hole 413 and may thus extend into the cabinet 1.

The first circuit board 4 may include an input unit 43. FIG. 4 exemplarily illustrates an embodiment in which the input unit is composed of a first input portion **43*a* and a second input portion 43*b***.

The first input portion **43*a* may be embodied as a unit configured to input a control command for requesting supply of power to the laundry treatment apparatus 100, and the second input portion 43*b* may be embodied as a unit configured to input a command for requesting execution of a control command displayed on the display unit 8 or a command of requesting temporary halt of a control command which is being executed by the laundry treatment apparatus 100. The first input portion 43*a* and the second input portion 43*b* may be fixed to the first main board so as to be connected to the control circuit of the first circuit board 4**.

As illustrated in FIG. 3, the first input portion **43*a* and the second input portion 43*b* may be exposed to the outside of the cabinet through a button mounting portion 135**, and may be configured to sense static electricity of a user body and thus to generate a control signal.

The button mounting portion 135 may include a first mounting portion **135*a* and a second mounting portion 135*b* which are formed through the front panel 13. Here, the first input portion 43*a* may be positioned at the first mounting portion 135*a*, and the second input portion 43*b* may be positioned at the second mounting portion 135*b***.

As illustrated in FIG. 4, the first input portion **43*a* and the second input portion 43*b* may have the same structure. Specifically, the first input portion 43*a* may include a button 431 positioned at the first mounting portion 135*a* and a button connector 436 configured to connect the button 431 to the control circuit of the first circuit board 4, and the second input portion 43***b* may include a button 431 positioned at the second mounting portion 135*b* and a button connector 436 configured to connect the button 431 to the control circuit of the first circuit board 4.

The first input portion 43*a* and the second input portion 43*b* may be separately provided in a right area and a left area around the display unit 8, or may be separately provided in an upper area and a lower area around the display unit 8. Alternatively, the first input portion 43*a* and the second input portion 43*b* may be separately disposed at upper and lower sides or right and left sides in one of a right area or a left area around the display unit 8.

The encoder 5 may be configured to rotatably fix the actuator 7 to the first circuit board 4 as well as to generate an electrical signal (or an electrical signal which is set to be changed according to a rotational angle of the actuator) upon rotation of the actuator 7.

The encoder 5 may include a stationary portion 51 which is fixed to the first circuit board 4 and to which the display unit 8 is fixed, a rotating portion 52 which is rotatably provided at the stationary portion 51 and to which the actuator 7 is fixed, and a signal generator 54 configured to generate an electrical signal upon rotation of the rotating portion 52.

The stationary portion 51 may be fixed to the first main board, and the signal generator 54 may be connected to the control circuit of the first circuit board 4. The stationary portion 51 may have a body through hole 53 connected to the board through hole 42 (and connected to the positioner through hole).

The rotating portion 52 may be embodied as a cylindrical rotating body rotatably coupled to the stationary portion 51.

The signal generator 54 may include a magnet fixed to the rotating portion 52, a sensor provided at the stationary portion 51 and configured to sense magnetic force, and a terminal connecting the control circuit of the first circuit board 4 to the sensor. The magnet may be composed of a plurality of permanent magnets which are disposed on the circumferential surface of the rotating portion 52 at predetermined intervals.

In order to prevent foreign substances from entering the encoder 5, the interface P may further include an encoder cover 6.

The encoder cover 6 may include a cover body 61 which is fixed to the first circuit board 4 and has the shape of a pipe surrounding the encoder 5, and a cover through hole 62 which is formed through the cover body 61 and into which the encoder 5 is inserted.

Figure 5:
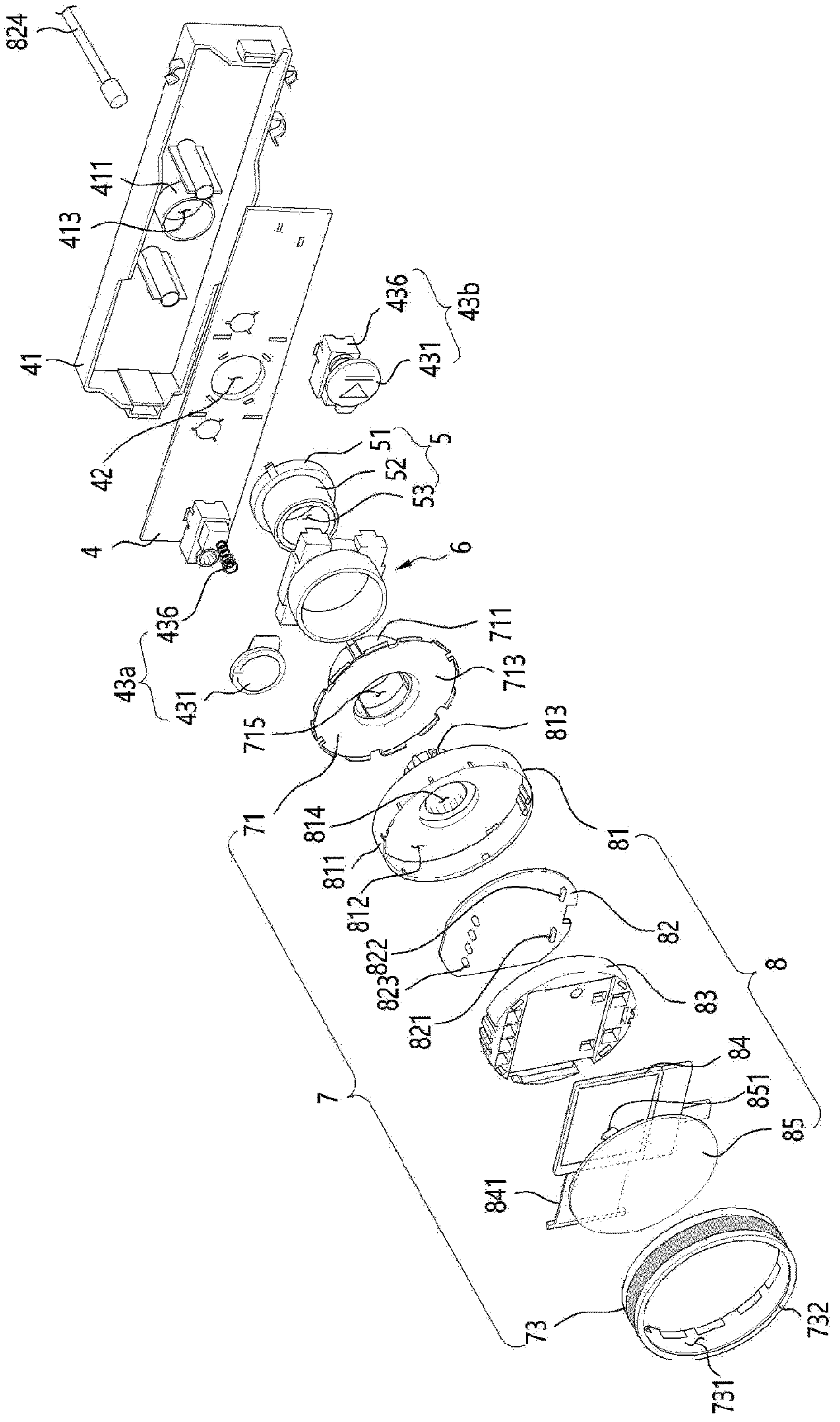

As illustrated in FIG. 5, the actuator 7 may include a shaft 71 which extends through the front panel 13 and is fixed to the rotating portion 52, and a handle 73 which is fixed to the shaft 71 and is positioned outside the cabinet 1.

The cabinet 1 may have a panel through hole 134 (see FIG. 3) which is formed through the front panel 13. The shaft 71 may be inserted into the panel through hole 134 and be coupled to the rotating portion 52.

The shaft 71 may include a shaft body 711 fixed to the rotating portion 52, a disc-shaped base 713 fixed to the circumferential surface of the shaft body, and a shaft through hole 715 which is formed through the shaft body 711 and is connected to the body through hole 53 in the encoder.

The handle 73 may be fixed to the shaft 71 so as to be positioned outside the cabinet 1. Accordingly, when a user rotates the handle 73, the rotating portion 52 may be rotated by the shaft 71.

The handle 73 may be constructed so as to have the shape of a cylinder having a receiving space therein, and may be fixed to the base 713. One surface of the handle 73 may be provided with a handle through hole 732 which allows the receiving space 731 to communicate with the outside and which exposes the display unit 8 to the outside.

The display unit 8 may include a housing 81 which is fixed to the stationary portion 51 of the encoder and is positioned in the receiving space 731 in the actuator, a display 84 which is fixed to the housing and which displays information (information about control and operation of the laundry treatment apparatus and the like), and a circuit board (a second circuit board or a display circuit board) 82 which is provided at the housing and which includes a control circuit (a second circuit) configured to control the display 84.

The housing 81 may include a fastening body 813 which is inserted into the shaft through hole 715 and the body through hole 53 and is fixed to the stationary portion 51, and a stationary body 811 which is fixed to the fastening body 813 and is positioned in the receiving space 731.

The stationary body 811 may have any shape as long as the stationary body can be inserted into the receiving space 731. The drawing exemplarily illustrates an embodiment in which the stationary body 811 has a cylindrical shape.

The stationary body 811 may be provided therein with a mounting space 812. The surface of the space defined by the stationary body 811 that faces in the direction of the handle through hole 732 may be provided with a stationary body through hole.

The fastening body 813 may have any shape as long as the fastening body 813 can be inserted into the shaft through hole 715 and the body through hole 53 in the encoder. The drawing exemplarily illustrates an embodiment in which the fastening body 813 has a circular cylindrical shape. The fastening body 813 may have a fastening body through hole 814 which allows the mounting space 812 to communicate with the board through hole 42.

The second circuit board 82 may be inserted into the mounting space 812, and the wire 824 connected to the second circuit board 82 may be taken to the outside of the housing 81 through the fastening body through hole 814. The second circuit board 82 may include a second main board and a control circuit (a second circuit) fixed to the second main board. The wire 824 may connect the control circuit of the second circuit board 82 to the control circuit of the first circuit board 4.

Figure 6:
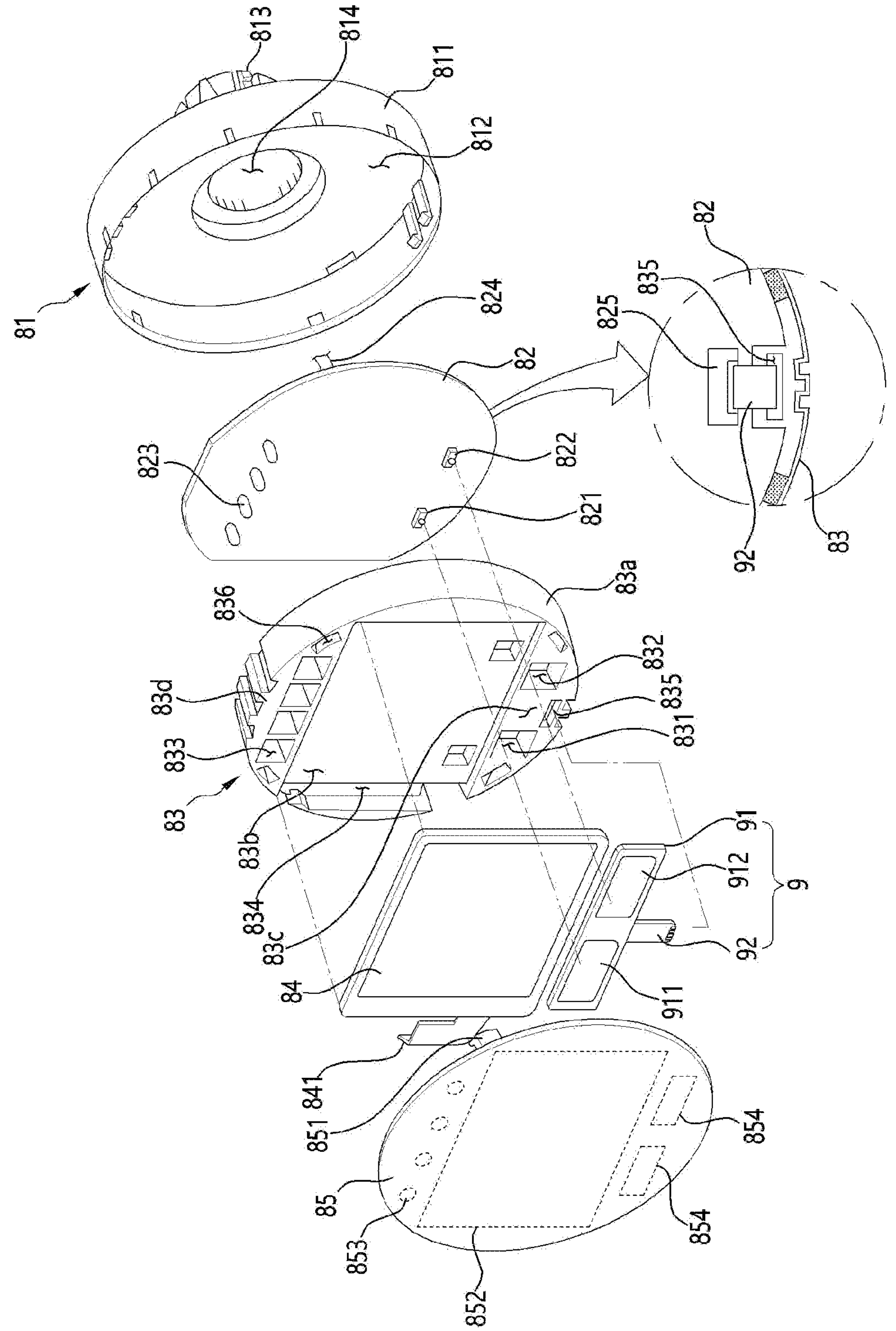
FIG. 6 illustrates an embodiment of a display unit.

In order to prevent water and foreign substances from entering the display 84 and the second circuit board 82, the display unit 8 may further include a cover 85 fixed to the stationary body 811 or a mounting portion 83 to be described later. FIG. 6 exemplarily illustrates an embodiment in which the cover 85 is fixed to the mounting portion 83 via a cover fixing protrusion 851 coupled to a cover fastening hole 836 in the mounting portion 83. The cover 85 should be made of a material having such a degree of transparency as to enable information displayed on the display 84 to be recognized from the outside.

The display unit 8 may include a plurality of lamps. FIG. 6 exemplarily illustrates an embodiment in which the lamp includes a first lamp 821, a second lamp 822, and a third lamp 823. Here, the lamps 821, 822 and 823 may be fixed to the second circuit board 82, and may be connected to the control circuit of the second circuit board.

The second circuit board 82 may control the display 84 to display information which is previously set according to rotation of the handle 73 (or according to an electrical signal supplied from a signal generator).

In order to maintain the distance between the second circuit board 82 and the display 84, to prevent damage to the lamp 821, and to guide the light emitted from the lamps 821, 822 and 823 to the outside of the mounting space 812, the mounting space 812 may be provided therein with the mounting portion 83.

The mounting portion 83 may include a mounting body 83*a* which is fixed to the stationary body 811 and is positioned in the mounting space 812. The mounting body 83*a* may have any shape as long as the mounting body 83*a* can be inserted into the mounting space 812. The drawing exemplarily illustrates an embodiment in which the mounting body 83*a* has an approximately cylindrical shape.

The mounting body 83*a* may include a panel mounting portion 83*b* defining space in which the display 84 is mounted, a film mounting portion 83*c* to which a selector unit 9 to be described later is mounted, and a lamp mounting portion 83*d* into which the third lamp 823 is inserted.

The panel mounting portion 83*b* may be embodied as a recess which is formed so as to receive the rear surface and the edge of the display 84 by depressing one surface of the mounting body 83*a*. Each of the film mounting portion 83*c* and the lamp mounting portion 83*d* may be positioned at any of upper, lower, right and left areas around the panel mounting portion 83*b*. FIG. 6 exemplarily illustrates an embodiment in which film mounting portion 83*c* is disposed in the lower area below the panel mounting portion 83*b* and the lamp mounting portion 83*d* is disposed in the upper area above the panel mounting portion 83*b*.

The display 84 may be connected to the control circuit of the second circuit board 82 via a connector (a first connector) 841. The panel mounting portion 83*b* may have a first connector through hole 834 through which the first connector 841 extends.

The film mounting portion 83*c* may include a first lamp through hole 831 configured to guide the light emitted from the first lamp 821 in the direction of the cover 84, and a second lamp through hole 832 configured to guide the light emitted from the second lamp 822 in the direction of the cover 85.

The lamp mounting portion 83*d* may have a third lamp through hole 833 configured to guide the light emitted from the third lamp 823 to the cover 85.

The interface P may further include the selector unit 9 which is disposed in the mounting space 812 and which transmits a control signal to the control circuit of the second circuit board 82 when a user body comes into contact with the cover 85.

The selector unit 9 may include a touch film 91 which is positioned at the film mounting portion 83*c* and which generates a control signal when a user body comes into contact with the cover 85, and a connector (a second connector) 92 connecting the touch film 91 to the control circuit of the second circuit board 82.

The mounting body 83*a* may have a second connector through hole 835 which is formed through the film mounting portion 83*c* and into which the second connector 92 is inserted. The rear surface of the second circuit board 82 may be provided with a terminal 825 to which the second connector 92 is fixed. The terminal 825 serves to connect the second connector 92 to the control circuit of the second circuit board 82.

The touch film 91 may include a first selector portion 911 to which a selection signal of a control command is input, and a second selector portion 912 to which an execution signal or a halting signal of the selected control command is input.

The first selector portion 911 may display a character or symbol such as selection or input, and the second selector portion 912 may display a character or symbol such as execution or halt. The character or symbol displayed on the first selector portion 911 may be recognized from the outside when the first lamp 821 emits light, and the character or symbol displayed on the second selector portion 912 may be recognized from the outside when the second lamp 822 emits light.

The first selector portion 911 and the second selector portion 912 may be positioned at the film mounting portion 83*c*, and the display 84 is positioned at the panel mounting portion 83*b*. Accordingly, the information displayed on the display 84 is not hidden by the first and second selector portions 911 and 912.

When the interface is constructed in the above-described manner, the cover 85 may be divided into a first display region 852 in which the information supplied from the display 84 is displayed, a second display region 853 in which the light emitted from the third lamp 823 is displayed, and an input region 854 in which the information displayed on the first and second selector portions 911 and 912 is displayed and which receives a control command from a user.

Unlike the embodiment shown in FIG. 6, the touch film 91 may also be positioned between the cover 85 and the display 84. In this case, it is preferable that the functions of the first selector portion and the second selector portions be to execute a control command displayed on the display 84.

Because the laundry treatment apparatus having the above-described structure is constructed such that display of control commands, search and change of the displayed control commands, and selection of the displayed control commands are conducted through the single interface P, it is possible to minimize a space required for installation of the interface P.

Figure 7:
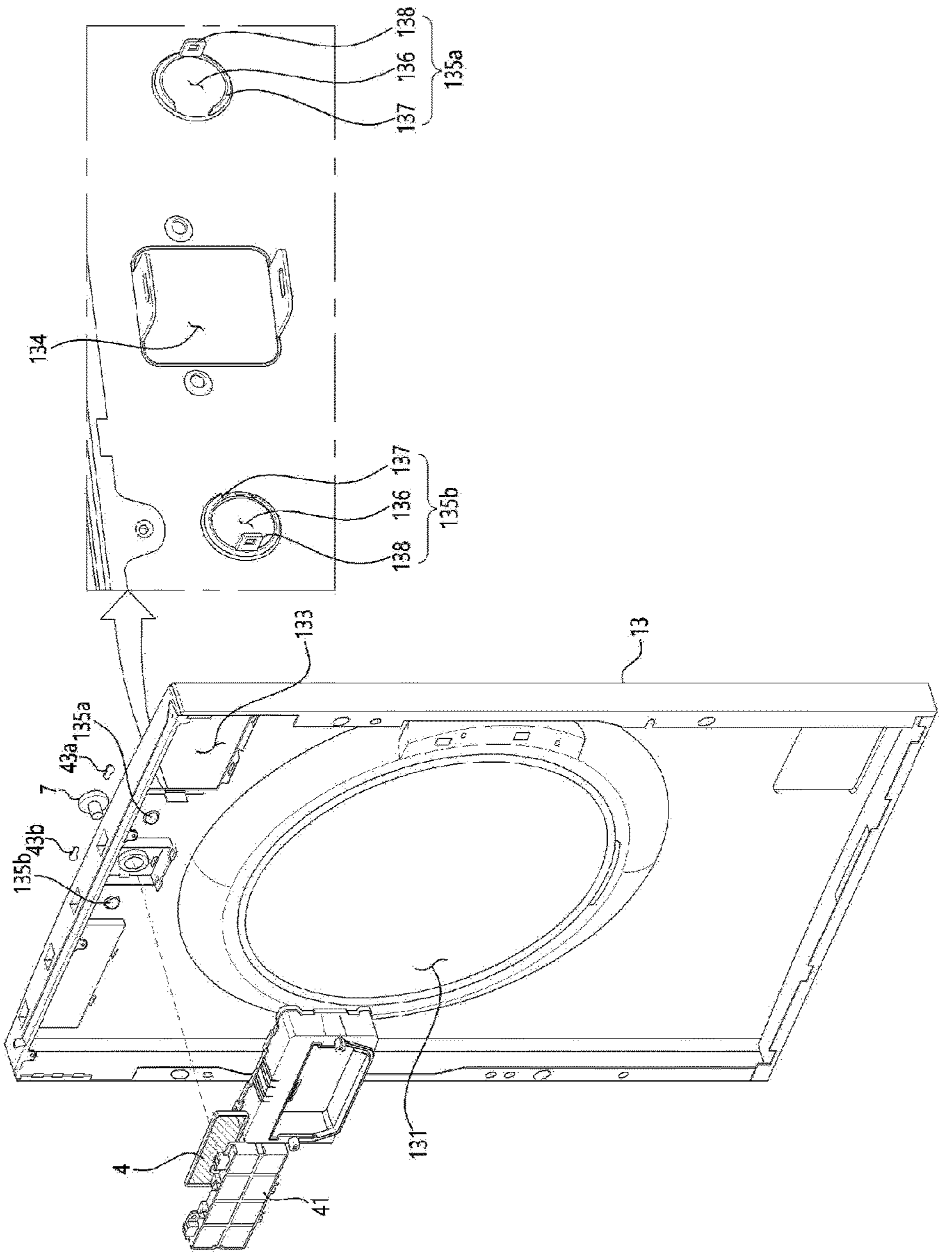
FIG. 7 illustrates an embodiment of a front panel and a button mounting portion.

FIG. 7 illustrates the structures of the first mounting portion 135*a* and the second mounting portion 135*b* to which the first input portion 43*a* and the second input portion are respectively fixed.

The first mounting portion 135*a* may include a mounting hole 136 which is formed through the front panel 13, a C-shaped bracket 137 provided at the edge of the mounting hole 136, and a positioner 138 provided at the bracket 137. The bracket 137 and the positioner 138 may be positioned in the cabinet 1.

The second mounting portion 135*b* may be constructed so as to have the same structure as the first mounting portion 135*a* while differing in installation position. Specifically, the second mounting portion 135*b* may include the mounting hole 136 which is positioned opposite to the first mounting portion 135*a* based on the panel through hole 134, and the positioner 138 provided at the bracket.

The first and second input portions 43*a* and 43*b* serve to input at least one of a control command abut power supply to the display unit 8, a control command about power supply to the drive unit 32, a control command about request for operation of the drive unit 32, or a control command about request for halt of operation of the drive unit 32.

The first input portion 43*a* may be embodied as a power button through which a control command about power supply to at least one of the display unit 8 or the drive unit 32 is input, and the second input portion 43*b* may be embodied as a control button through which at least one of a control command requesting operation of the drive unit 32 (a control command requesting execution of a control command selected by a user) or a control command requesting halt of operation of the drive unit 32 is input.

Figure 8:
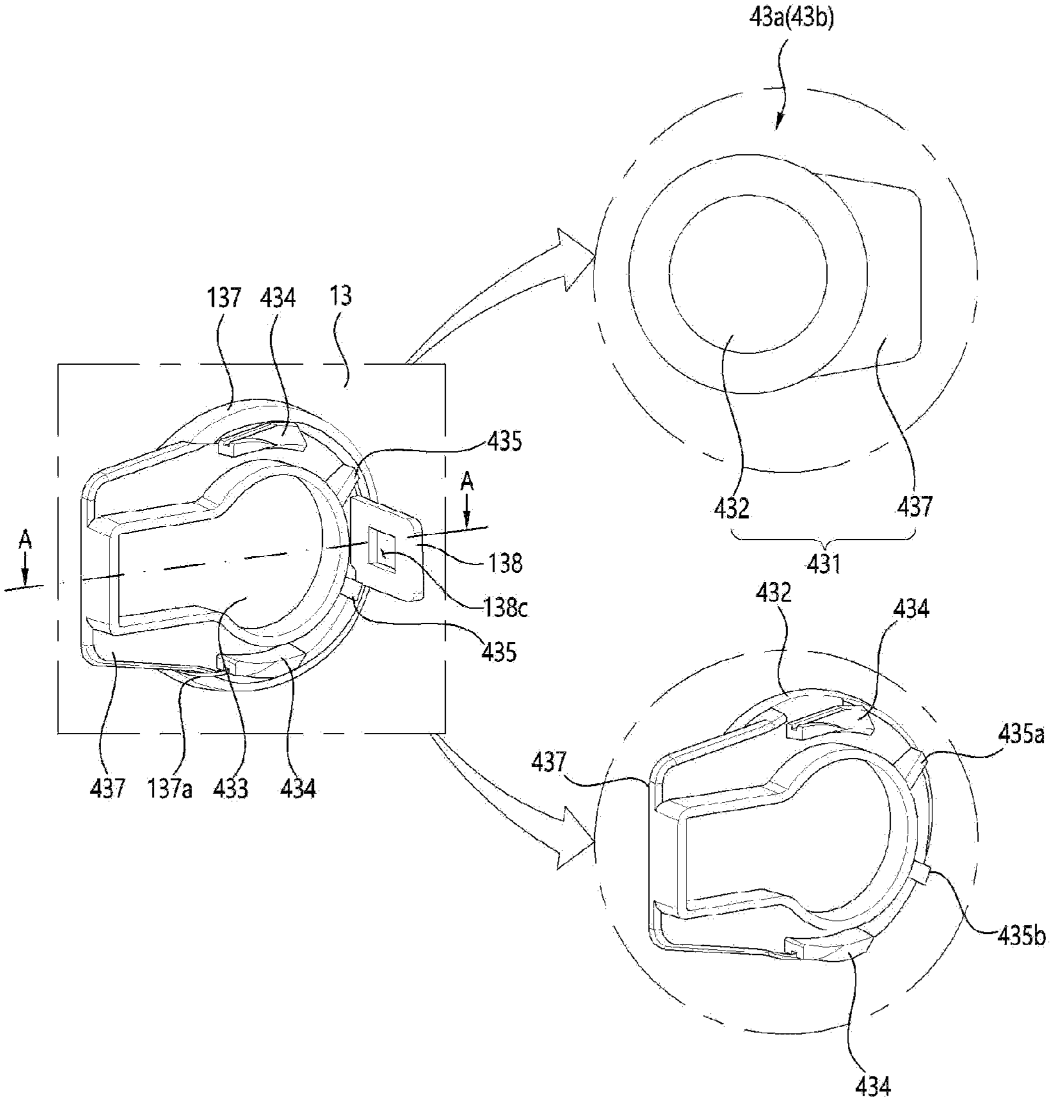
FIGS. 8 and 9 illustrate an embodiment of a coupling structure between the button mounting portion and buttons.

As described above, each of the first input portion 43*a* and the second input portion 43*b* may include the button 431 and the button connector 436. As illustrated in FIG. 8, the button 431 may include a support body 433 which is supported by the bracket 137 and is positioned in the cabinet 1, a contact body 432 which is fixed to the support body 433 and is exposed to the outside of the cabinet 1 through the mounting hole 136, and a body fastening portion 434 configured to fix the support body 433 to the cabinet 1.

The body fastening portion 434 may include two or more hooks which project from the support body 433 and are coupled to the bracket 137.

The area of the contact body 432 may be set to be smaller than the area of the support body 433. The support body 433 may include an insert portion 437 which is inserted into the opening in the C-shaped bracket 137.

Figure 9:
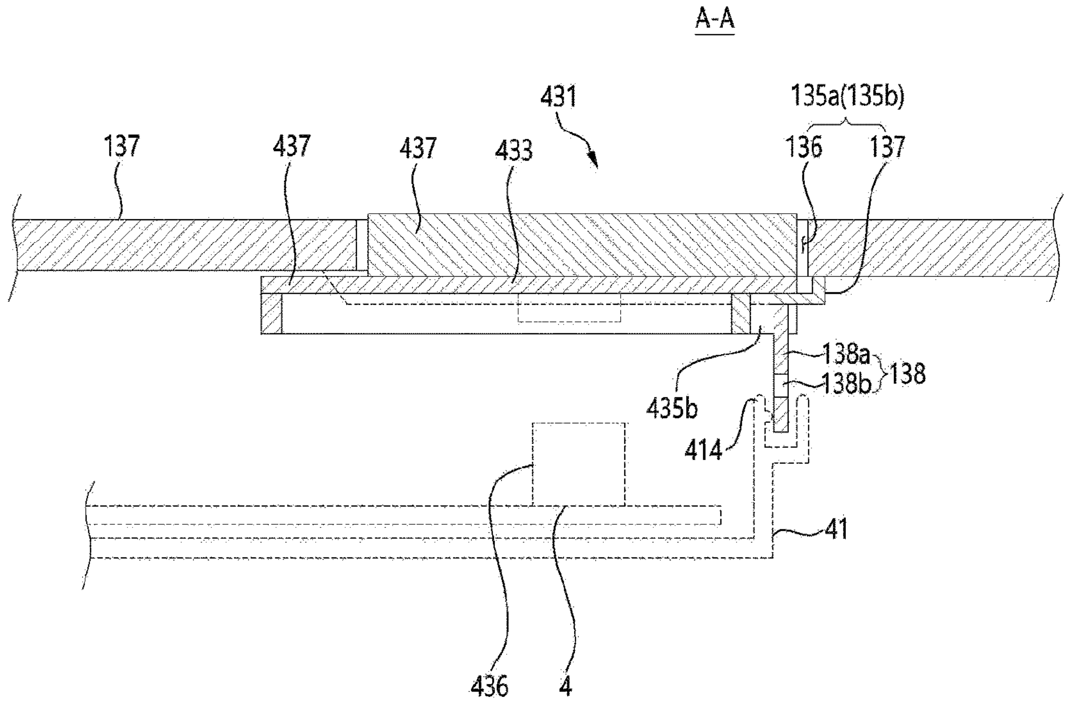

As illustrated in FIG. 9, when the insert portion 437 is inserted into the opening in the bracket 137, the edge of the support body 433 may be supported by the bracket 137, and the body fastening portion 434 may be fastened to the bracket 137. Accordingly, when the insert portion 437 is inserted into the opening 137*a* in the bracket 137 and then the contact body 432 is pushed, the body fastening portion 434 is coupled to the bracket 137, thereby enabling the button 431 to be easily assembled with the front panel 13.

Although the above-described bracket 137, the insert body 437 and the body fastening portion 434 are provided, there may be a problem in that the edge of the contact body 432 does not coincide with the edge of the mounting hole 136 due to assembly tolerance or the like.

In order to prevent a stepped portion larger than a designed stepped portion from being formed between the surface of the contact body 432 and the surface of the front panel 13 or to prevent the contact body 432 from being assembled with the mounting hole 136 in a rotated state, the button 431 may be provided with a guide 435 with which the positioner 138 is engaged so as to prevent rotation of the button 431.

The positioner 138 may include a protrusion 138*a* which projects toward the inside of the cabinet 1 from the bracket 137 (in a direction far away from the front panel), and the guide 435 may include a first rib 435*a* and a second rib 435*b* which are provided at the support body 433 so as to define a space in which the protrusion 138*a* is received.

Considering assembly efficiency of the button 431, it is preferable that the protrusion 138*a* be fixed to the bracket 137 so as to be positioned opposite to the opening 137*a* in the bracket 137 and the first rib 435*a* and the second rib 435*b* be fixed to the support body 433 so as to positioned opposite to the insert body 437.

Meanwhile, the case 41 to which the first circuit board 4 may be fixed to the positioner 138. The protrusion 138*a* may have a protrusion through hole 138*b*, and the case 41 may include a fastening protrusion 414 which is coupled to the protrusion through hole 138*b*. Unlike this embodiment, the case 41 may also be fixed to the protrusion 138*a* by means of a bolt.

As described above, the contact body 432 may be connected to the control circuit of the first circuit board 4 via the button connector 436 fixed to the first circuit board 4. The button connector 436 may be configured to generate a control signal when a user body comes into contact with the contact body 432. Here, the button connector 436 may include a touch film fixed to the support body 433, and a conductor connecting the touch film to the control circuit of the first circuit board 4.

Unlike the above-described embodiment, the button connector 436 may also be configured to generate a control signal when external force pushing the contact body 432 toward the inside of the cabinet 1 is detected.

Because the structure and the control process of the laundry treatment apparatus are disclosed with reference to several embodiments of the present disclosure, the protection scope of the present disclosure is not limited to the embodiments.

What is claimed is:

1. An interface comprising:

an encoder comprising a stationary portion fixed to a first circuit board, a rotating portion rotatably coupled to the stationary portion, and a signal generator configured to transmit a control signal to a control circuit of the first circuit board upon rotation of the rotating portion;

an actuator comprising a shaft fixed to the rotating portion, a handle which is fixed to the shaft and to which force required for rotation of the shaft is applied, a receiving space defined in the handle, and a handle through hole which is formed through one surface of the handle so as to allow the receiving space to communicate with an outside;

a display unit comprising a fastening body which extends through the shaft and is fixed to the stationary portion, a stationary body which is fixed to the fastening body and is positioned in the receiving space, a mounting space defined in the stationary body, a display which is fixed in the mounting space and displays information, a second circuit board which controls the display and enables exchange of control signals with the first circuit board, and a cover which is fixed to the stationary body so as to close the mounting space; and a selector unit which is provided in the mounting space and is configured to transmit a control signal to a control circuit of the second circuit board when a user body comes into contact with the cover, wherein the selector unit comprises a first selector portion configured to receive a selection signal of a control command, and a second selector portion configured to receive an execution signal or a halt signal of a selected control command.

2. The interface of claim 1, wherein the first selector portion and the second selector portion are positioned so as not to interfere with the display.

3. The interface of claim 2, further comprising:

a mounting body fixed in the mounting space;

a panel mounting portion which is provided at the mounting body and to which the display is mounted; and a film mounting portion which is provided at the mounting body and to which the first selector portion and the second selector portion are mounted.

4. The interface of claim 3, wherein the film mounting portion is positioned below the panel mounting portion.

5. The interface of claim 3, further comprising:

first and second lamps which are provided at the second circuit board so as to emit light;

a first lamp through hole which is formed through the mounting body so as to guide light emitted from the first lamp to the first selector portion; and a second lamp through hole which is formed through the mounting body so as to guide light emitted from the second lamp to the second selector portion.

6. The interface of claim 1, wherein the first selector portion and the second selector portion are positioned between the cover and the display.

7. The interface of claim 3, further comprising:

a first connector connecting the display to the second circuit board;

a second connector connecting the first and second selector portions to the second circuit board;

a first connector through hole which is formed through the mounting body and into which the first connector is inserted; and a second connector through hole which is formed through the mounting body and into which the second connector is inserted.

8. A laundry treatment apparatus comprising:

a drum which defines a space configured to receive laundry and which is rotated by a drive unit;

an encoder comprising a first circuit board configured to control the drive unit, a stationary portion fixed to the first circuit board, a rotating portion rotatably coupled to the stationary portion, and a signal generator configured to transmit a control signal to a control circuit of the first circuit board upon rotation of the rotating portion;

an actuator comprising a shaft fixed to the rotating portion, a handle which is fixed to the shaft and to which force required for rotation of the shaft is applied, a receiving space defined in the handle, and a handle through hole which is formed through one surface of the handle so as to allow the receiving space to communicate with an outside;

a display unit comprising a fastening body which extends through the shaft and is fixed to the stationary portion, a stationary body which is fixed to the fastening body and is positioned in the receiving space, a mounting space defined in the stationary body, a display which is fixed in the mounting space and displays information, a second circuit board which controls the display and enables exchange of control signals with the first circuit board, and a cover which is fixed to the stationary body so as to close the mounting space; and a selector unit which is provided in the mounting space and is configured to transmit a control signal to a control circuit of the second circuit board when a user body comes into contact with the cover, wherein the selector unit comprises a first selector portion configured to receive a selection signal of a control command, and a second selector portion configured to receive an execution signal or a halt signal of a selected control command.

9. The laundry treatment apparatus of claim 8, further comprising:

a mounting body fixed in the mounting space;

a panel mounting portion which is provided at the mounting body and to which the display is mounted; and a film mounting portion which is provided at the mounting body and which has a space in which the first selector portion and the second selector portion are mounted, the film mounting portion being positioned below or above the panel mounting portion.

10. The laundry treatment apparatus of claim 9, further comprising:

first and second lamps which are provided at the second circuit board so as to emit light;

a first lamp through hole which is formed through the mounting body so as to guide light emitted from the first lamp to the first selector portion; and a second lamp through hole which is formed through the mounting body so as to guide light emitted from the second lamp to the second selector portion.

11. The laundry treatment apparatus of claim 10, further comprising:

a first connector connecting the display to the second circuit board;

a second connector connecting the first and second selector portions to the second circuit board;

a first connector through hole which is formed through the mounting body and into which the first connector is inserted; and a second connector through hole which is formed through the mounting body and into which the second connector is inserted.

* * * * *